US011082566B2

(12) United States Patent
Xu et al.

(10) Patent No.: US 11,082,566 B2
(45) Date of Patent: Aug. 3, 2021

(54) MULTIPLE CAMERA CALIBRATION CHART

(71) Applicant: OmniVision Technologies, Inc., Santa Clara, CA (US)

(72) Inventors: Shan Xu, Singapore (SG); Xinting Gao, Singapore (SG); Bin Chen, San Jose, CA (US); Ye Tao, Shanghai (CN); Guansong Liu, San Jose, CA (US); Lu Chang, Cupertino, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 46 days.

(21) Appl. No.: 15/627,813

(22) Filed: Jun. 20, 2017

(65) Prior Publication Data
US 2018/0367681 A1    Dec. 20, 2018

(51) Int. Cl.
*H04N 1/00* (2006.01)
*G06T 7/80* (2017.01)

(52) U.S. Cl.
CPC ........... *H04N 1/00045* (2013.01); *G06T 7/85* (2017.01); *G06T 2207/30208* (2013.01)

(58) Field of Classification Search
CPC .................................................. H04N 1/00045
See application file for complete search history.

(56) References Cited

U.S. PATENT DOCUMENTS

| | | | |
|---|---|---|---|
| 2003/0091227 A1* | 5/2003 | Chang ..................... | G06T 17/10 382/154 |
| 2014/0056508 A1* | 2/2014 | Lee ....................... | G06K 9/6201 382/154 |
| 2014/0211227 A1* | 7/2014 | Yedid Am .............. | H04N 1/506 358/1.13 |
| 2014/0247354 A1* | 9/2014 | Knudsen .................. | B60R 1/00 348/148 |
| 2016/0150142 A1* | 5/2016 | Lapstun ................. | B64D 47/08 348/36 |
| 2018/0096487 A1* | 4/2018 | Nash ...................... | H04N 5/217 |

\* cited by examiner

*Primary Examiner* — Jefferey F Harold
*Assistant Examiner* — Justin B Sanders

(57) ABSTRACT

A chart for calibrating a system of multiple cameras, the chart comprising: a background; an array of dots contrasting the background, wherein the array of dots are arranged in rows and columns, wherein the array of dots comprise a first dot array, and a second dot array, wherein the first dot array fully occupies a first region of evenly spaced dots with a first dot density, the second dot array fully occupies a second region of evenly spaced dots with a second dot density, and wherein the second region is enclosed within the first region; a group of first markers in the first region, a group of second markers in the second region, and a third marker at the center of the chart, wherein each second marker is closer to the third marker than each first marker.

9 Claims, 10 Drawing Sheets

MULTIPLE CAMERA CALIBRATION CHART

TECHNICAL FIELD

This disclosure relates generally to camera calibration systems, and in particular but not exclusively, relates to using a special chart to digitally calibrate a dual camera module. The dual camera module may include two cameras of different focal lengths, such as a wide angle field-of-view (wide-FOV) camera and a telephoto lens camera. The dual camera module may also include two cameras of the same focal length, wherein one camera is a color camera and the other camera is a monochromic camera.

BACKGROUND INFORMATION

Mobile devices such as cell phones have a conventional design that includes one rear-facing camera and one front-facing camera. The rear-facing camera is positioned at the backside of the phone, and generally has a higher pixel resolution than the front-facing camera. Recently, manufacturers have been implementing dual camera modules as rear-facing cameras on mobile phones. A dual camera module includes two cameras, for example, a wide field-of-view (wide FOV) camera to capture a wide FOV image; and a zoom telephoto lens (e.g., 2× zoom) camera to capture a close-up, zoomed-in image. The lenses of both cameras are fixed, and are not to be moved during image capture, but by digitally transitioning between the wide FOV image and the zoomed-in telephoto image, the dual camera module mimics a camera zooming effect normally achieved only with a movable, telescopic zooming lens. In essence, the dual camera module creates the perception of an in-depth scene geometry by using triangulation. Accomplishing such a feat requires an accurate, pixel level correspondence matching between the two cameras, such that an in-depth scene effect may be obtained.

Ideally, if a pair of cameras in a dual camera module are perfectly aligned and distortion-free, the pixel level correspondence matching may be readily obtained. However in reality, the two cameras will often have a certain degree of lens distortion as well as camera position misalignment, due to imperfections of manufacturing and installation. As a result, the direct correspondence matching is often difficult to achieve, and an estimated depth map becomes unreliable. Therefore, it is desirable to correct for the aforementioned lens distortion and camera misalignment, in order to improve the performance of the dual camera module.

BRIEF DESCRIPTION OF THE DRAWINGS

Non-limiting and non-exhaustive examples of the invention are described with reference to the following figures, wherein like reference numerals refer to like parts throughout the various views unless otherwise specified.

FIG. 2AA is a deconstruction of a dot array calibration chart.

FIG. 2AB is a deconstruction of a pre-stored ideal image.

Figure 1A:
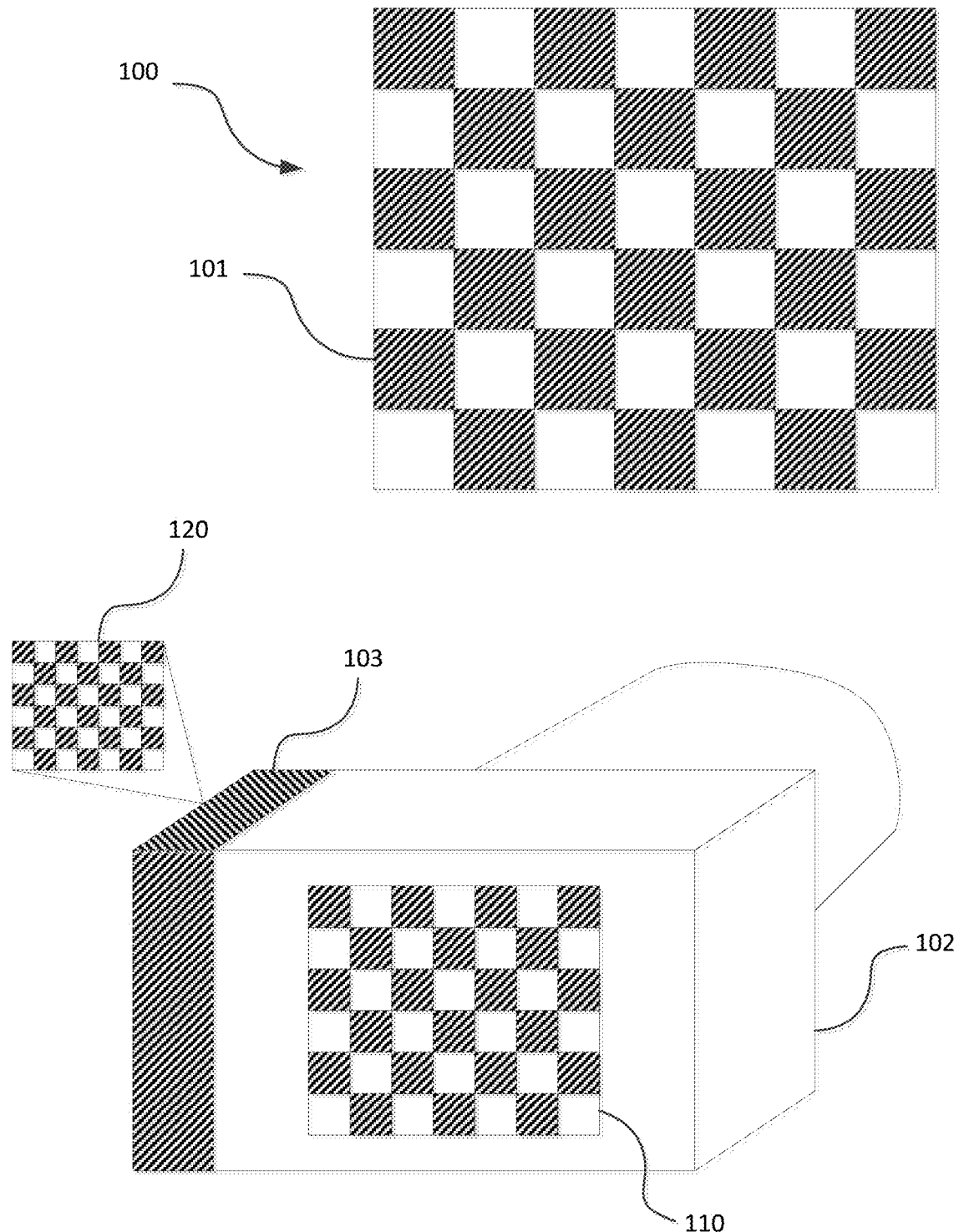
FIG. 1A is an exemplary embodiment of a camera being calibrated with a checkerboard calibration chart.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth to provide a thorough understanding of the examples. One skilled in the relevant art will recognize; however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "example" or "embodiment" means that a particular feature, structure, or characteristic described in connection with the example is included in at least one example of the present invention. Thus, the appearances of "example" or "embodiment" in various places throughout this specification are not necessarily all referring to the same example. Furthermore, the particular features, structures, or characteristics may be combined in any suitable manner in one or more examples.

Throughout this specification, several terms of art are used. These terms are to take on their ordinary meaning in the art from which they come, unless specifically defined herein or the context of their use would clearly suggest otherwise.

A system of cameras includes multiple cameras. In one embodiment, the system of camera is a dual camera module that includes two cameras, wherein a first camera is a color camera that includes multi-colored filters (e.g., red, green, and blue color filters) as part of its image sensor pixels, and a second camera is a monochromic camera that includes only a single type of colored filters (e.g., green filters only).

In another embodiment, a dual camera module includes a first camera whose lens has a first focal length, and a second camera whose lens has a second focal length. As an example of this embodiment, the first focal length is twice the second focal length. In a specific design of this example, the first camera is a wide field-of-view (wide FOV) camera that captures a wide field image, and the second camera is a zoom telephoto lens (e.g., 2× zoom) camera that captures a close-up zoom image.

Throughout this disclosure, a dual camera module comprising a wide FOV camera and a 2× telephoto camera is used to illustrate various embodiments of the invention. It is appreciated that the scope of invention is not limited to the wide FOV camera and telephoto camera pair. The wide FOV camera and telephoto camera are only exemplary terms that are used for illustrative purposes. Other terms referring to a first camera and a second camera (for example, a first camera of a first focal length and a second camera of a second focal length) are equally applicable in this disclosure. Further, in some instances, the first focal length is twice the second focal length.

The two cameras may often have a certain degree of lens distortion and camera positional misalignment due to imperfections in their factory manufacturing and subsequent installation into the dual camera module. It is desirable to calibrate the two cameras after their installation in order to correct for possible lens distortion, and also to rectify both the wide FOV image and the telephoto image as if the two cameras had been aligned perfectly based on relative camera pose estimations.

Figure 1B:
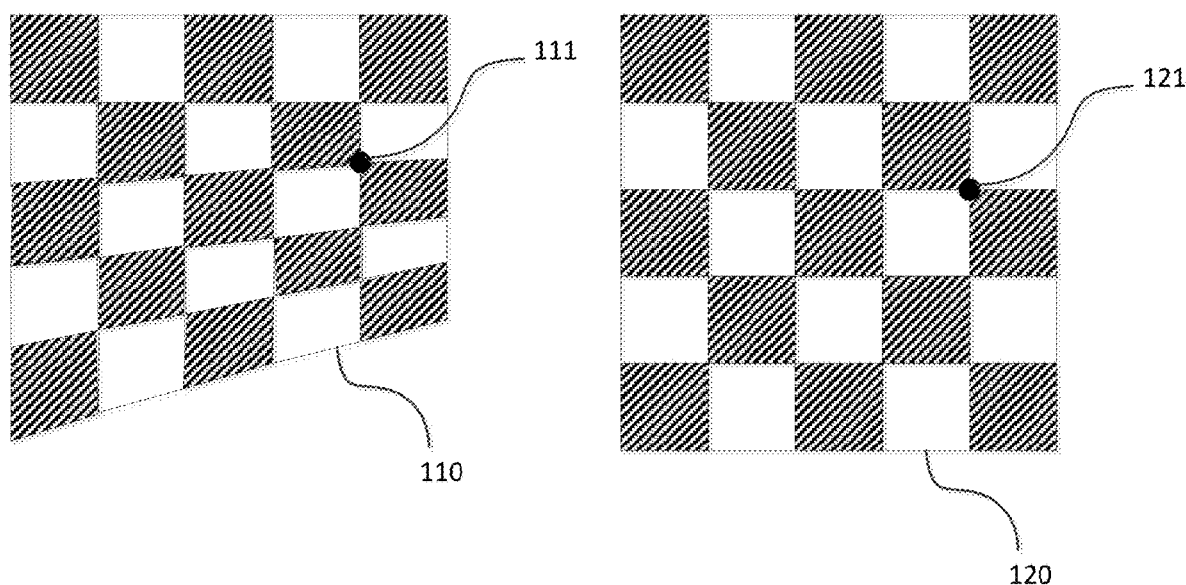
FIG. 1B is a comparison between a pre-stored ideal checkerboard calibration chart image and an image taken of an actual checkerboard calibration chart.

FIG. 1A shows an exemplary, checkerboard chart-based camera calibration system 100, wherein a camera 102 is calibrated by first taking an image 110 of a black-and-white checkerboard chart 101, and then matching this image 110 to an ideal checkerboard image 120 already pre-stored in the camera's memory 103. The pre-stored, ideal image 120 is devoid of any distortion, whereas the image 110 taken by camera 102 of chart 101 may be distorted due to both the camera lens imperfection and the positional misalignment of camera 102 vis-à-vis the checkerboard chart 101. In practice, the matching of the taken image 110 to the ideal image 120 is done point by point, wherein each matching point is a "four-corners" point, i.e., the crossing point where two black and two white squares meet. For example, as shown in FIG. 1B, a given point 111 on the taken image 110 is matched to the corresponding point 121 of the ideal image 120. The operating parameters (e.g., image output parameters) of camera 102 are then digitally adjusted such that the distorted image 110 may be corrected to an image that is a pure, accurate, and/or precise projection of the (distortion-free) ideal image 120.

The aforementioned camera calibration process based on checkerboard chart has several drawbacks. These drawbacks are particularly prominent when the same checkerboard chart is used to calibrate a dual camera module consisting of a wide-FOV camera and a telephoto camera. First, calibration with the checkerboard chart only works well for focused images with sharp edges, wherein the "four-corners" points are readily locatable, but this approach does not work well for non-focused images, wherein the "four-corners" points are blurry, hence are not easily locatable. Second, the checkerboard holds a lower point density for the wide-FOV camera that operates without a zoom, but holds a higher point density for the telephoto camera which operates with a zoom, for example, a 2× zoom. The focal lengths of the two cameras are different, and dealing with images of two different point densities is complex. Third, the matching between the points in an ideal image (pre-stored in the camera's memory) and the points of a taken image is time consuming when point density is high. Fourth, the checkerboard's symmetrical layout makes it difficult to discern whether the taken image is upside down or right side up. Fifth, the checkerboard chart approach is not able to compensate for the measurement errors caused by optical aberration.

Figure 2A:
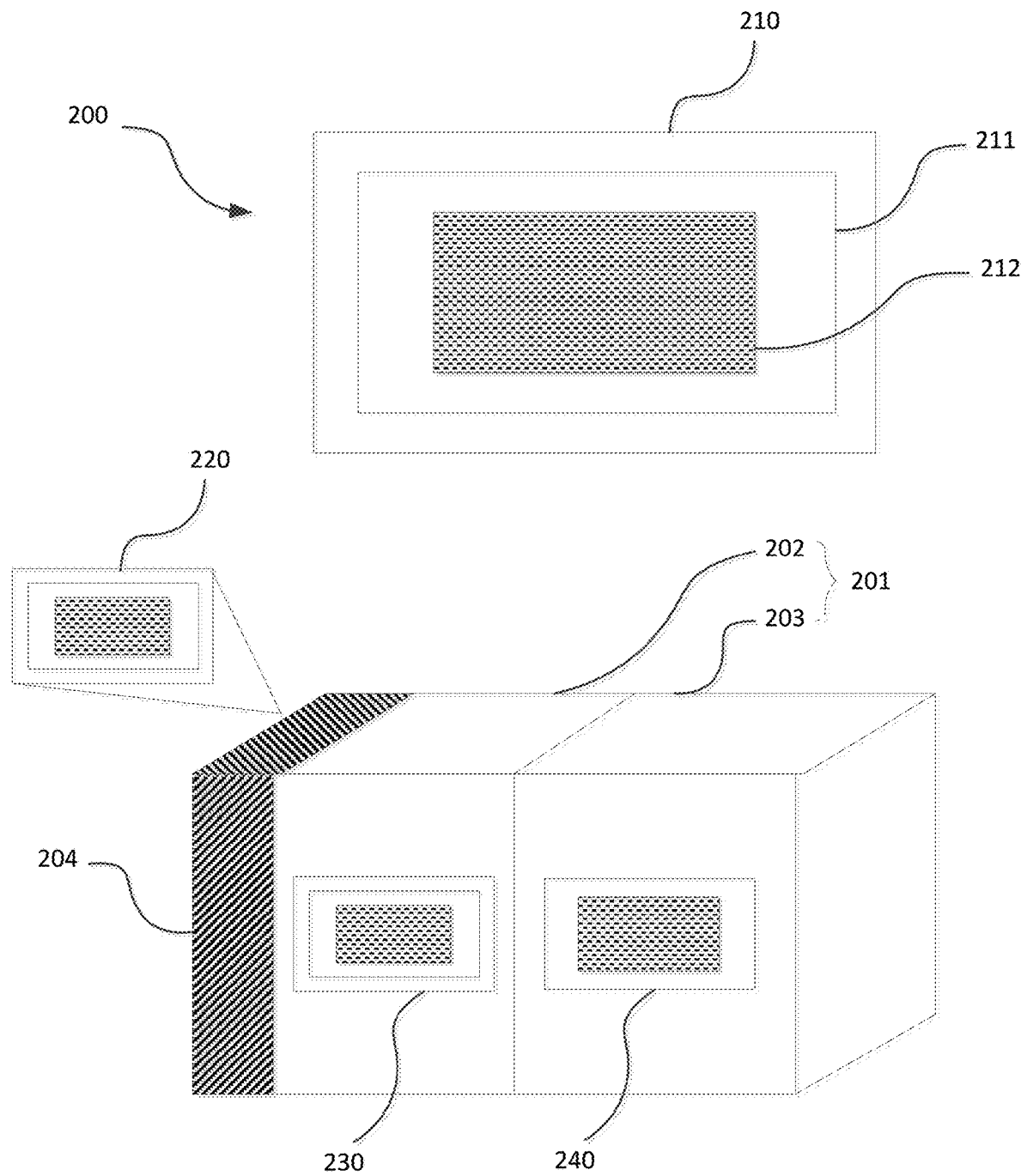
FIG. 2A is an exemplary embodiment of a dual camera module being calibrated with a dot array calibration chart.
Figure 2A:
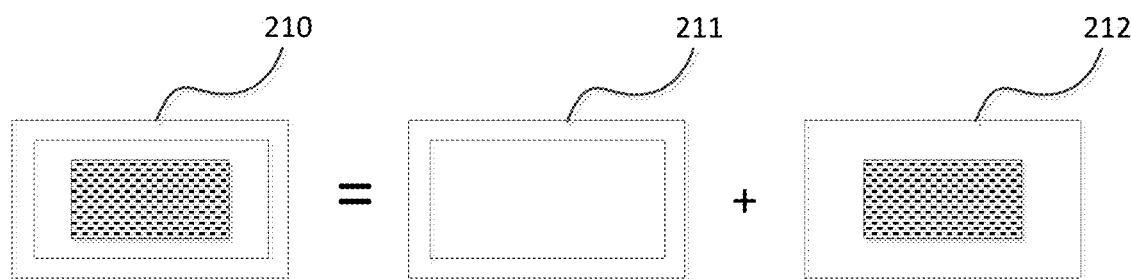
Figure 2A:
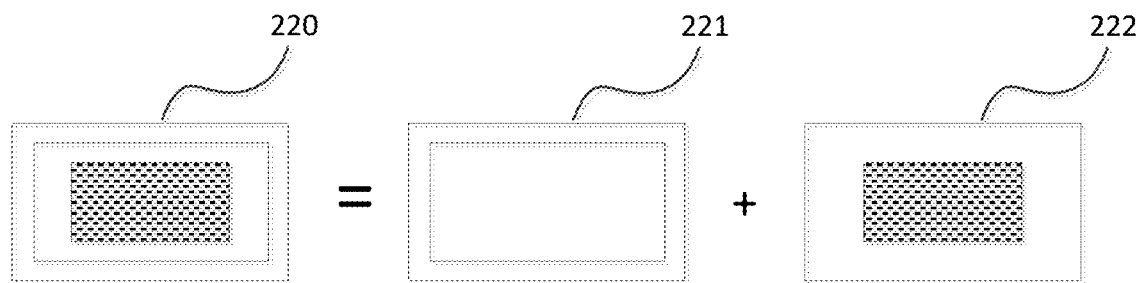

An embodiment of an improved camera calibration system based on a dot array chart is disclosed herein. FIG. 2A shows a dot array chart based camera calibration system 200, wherein a camera system such as a dual camera module 201 is calibrated by first taking two images 230 and 240 of a dot array chart 210, and then matching each image to an ideal image 220 that is pre-stored in the dual camera module's memory 204. More specifically for this embodiment, the dual camera module 201 includes a wide-FOV camera 202 and a telephoto camera 203. The dual camera module 201 is positioned directly in front of the dot array chart 210, i.e., in an orthogonal viewing position.

The dot array chart 210 includes a first chart region 211 that spans the entirety of the chart 210, and a chart second region 212 that is localized around the center of the chart 210. As shown in more detail in FIG. 2AA, the first chart region 211 is larger than the second chart region 212. The first chart region 211 overlaps with the second chart region 212 for the entirety of the second chart region 212, and encloses the second chart region 212. In sum, the dot array chart 210 is the first chart region 211 superimposed on to the second chart region 212.

The pre-stored ideal image 220 corresponds to the dot array chart 210. More specifically as shown in FIG. 2AB, the pre-stored ideal image 220 includes a first ideal image region 221 that corresponds to the first chart region 211, and a second ideal image region 222 that corresponds to the second chart region 212. The first ideal image region 221 is larger than the second ideal image region 222. The first ideal image region 221 overlaps with the second ideal image region 222 for the entirety of the second ideal image region 222, and encloses the second ideal image region 222. In sum, the ideal image 220 is the first ideal image region 221 superimposed on to the second ideal image region 222.

The wide FOV camera 202 takes a wide FOV image 230 of the dot array chart 210 in its entirety, including both the first chart region 211 and the second chart region 212. The telephoto camera 203 takes a telephoto image 240 of the dot array chart 210, zooming in onto its second chart region 212 but essentially excluding part of the first chart region 211 that does not overlap with the second chart region 212. Since both the wide FOV camera 202 and the telephoto camera 203 may possibly have some lens distortion and positional misalignment (with regard to chart 210 and/or to each other), the wide FOV image 230 and the telephoto image 240 may also suffer from some degree of distortion vis-à-vis the pre-stored ideal image 220. After images 230 and 240 are taken, each will be matched to the pre-stored ideal image 220, as disclosed herein.

Figure 2B:
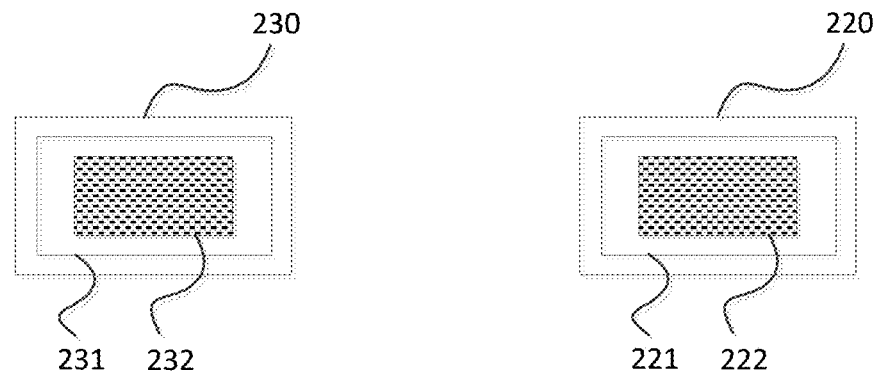
FIG. 2B is the comparison between a pre-stored ideal dot array calibration chart image and an image taken of an actual dot array calibration chart by a wide FOV camera.

FIG. 2B shows an embodiment of the matching of the wide FOV image 230 to the pre-stored ideal image 220. The wide FOV image 230 includes a first FOV image region 231 that corresponds to the first chart region 211 of the dot array chart 210, and a second FOV image region 232 that corresponds to the second chart region 212 of the dot array chart 210. When the wide FOV image 230 is matched to the pre-stored ideal image 220, only the first FOV image region 231 is matched to the first ideal image region 221. There is no matching of the second FOV image region 232 to any part of the ideal image 220. The matching is performed in a dot by dot fashion, wherein a dot of the first FOV image region 231 is matched to a corresponding dot of the first ideal image region 221. As a result of this matching, the operating parameters (e.g., image output parameters) of the wide FOV camera 202 are adjusted accordingly (e.g., through digital means), such that the distorted, wide FOV image 230 may be rectified to exactly match the distortion-free ideal image 220.

Figure 2C:
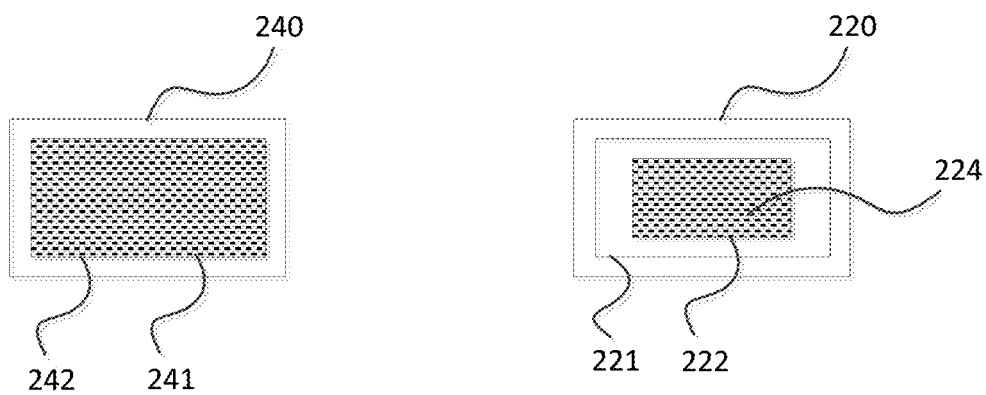
FIG. 2C is the comparison between a pre-stored ideal dot array calibration chart image and an image taken of an actual dot array calibration chart by a telephoto lens camera.

FIG. 2C shows an embodiment of the matching of the telephoto image 240 to the pre-stored ideal image 220. The telephoto image 240 includes a second telephoto image region 242 that corresponds to the second chart region 212 of the dot array chart 210. The telephoto image 240 does not include the entirety of a first image region that corresponds to the first chart region 211 of the dot array chart 210. Rather, the telephoto image 240 includes a partial first telephoto image region 241 that corresponds to the part of the first chart region 211 that overlaps with the second chart region 212. In other words, the telephoto image 240 is a superposition of the second telephoto image region 242 with the partial first telephoto image region 241. When the telephoto image 240 is matched to the pre-stored ideal image 220, the entire telephoto image 240 is matched to a central region 224 of the ideal image 220. This central region 224 is a superposition of the second ideal image region 222 on to a partial first ideal image region 223, wherein this partial first ideal image region 223 is the part of the first ideal image region 221 that overlaps with the second ideal image region 222. The matching is performed in a dot by dot fashion, wherein a dot of the telephoto image 240 is matched to a corresponding dot of the central region 224 of the ideal image 220. As a result of this matching, the operating parameters (e.g., image output parameters) of the telephoto camera 203 are adjusted accordingly (e.g., through digital means), such that the distorted, telephoto image 240 may be rectified to exactly match the central region 224 of the distortion-free ideal image 220.

As a result the procedure disclosed above, both the wide FOV camera 202 and the telephoto camera 203 will have their operating parameters adjusted such that their pre-existing problems, e.g., lens distortion, positional misalignment, etc., may be duly corrected as if the two cameras had been distortion free and properly aligned in the first place.

Figure 3:
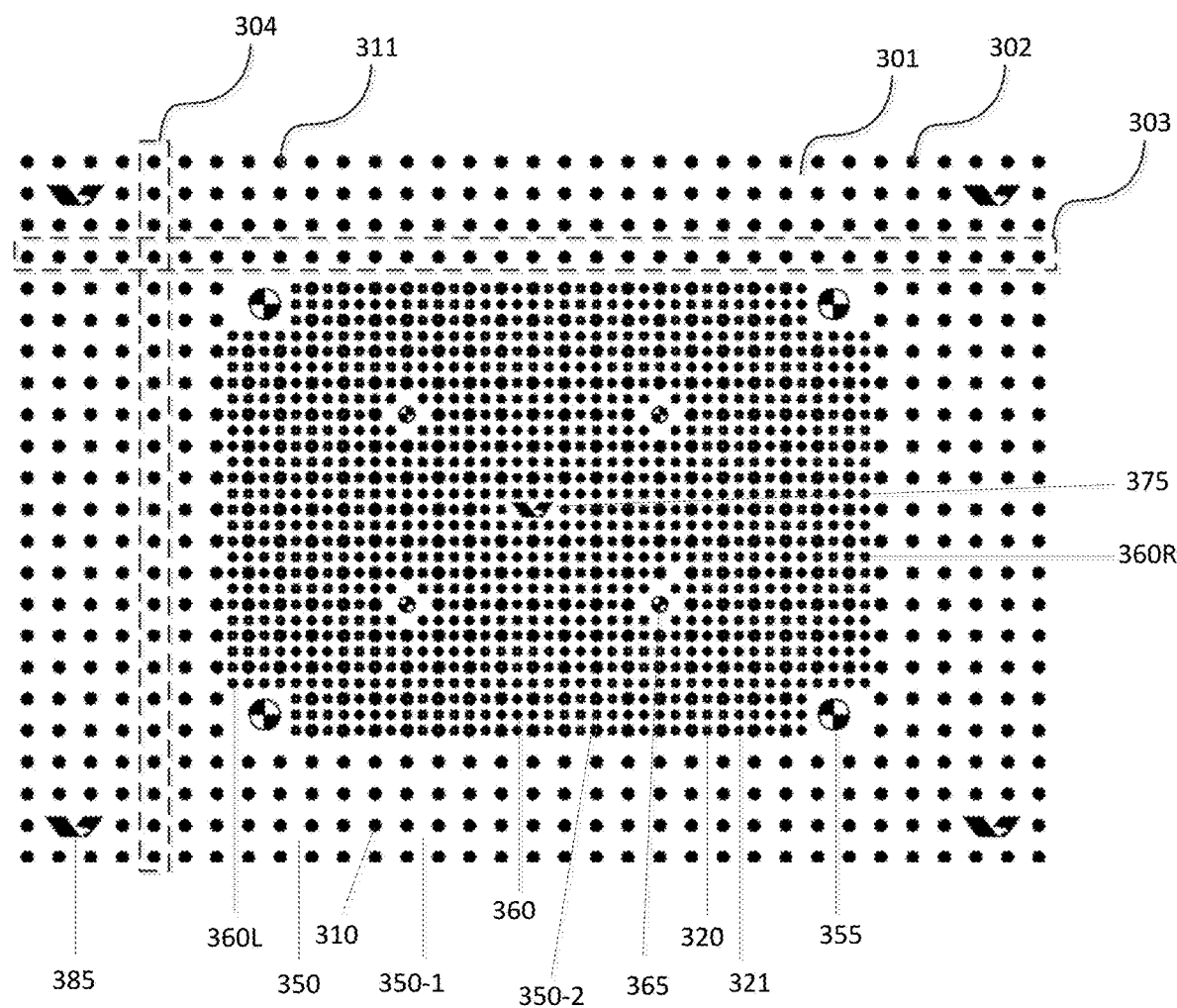
FIG. 3 is an exemplary dot array calibration chart.

FIG. 3 is an embodiment of a calibration chart 300 that is used in dual camera module calibration. The calibration chart 300 is an example of the chart 210 previously disclosed in FIGS. 2A and 2AA. Chart 300 may be made of paper, plastic, fabric, or other types of material, as well as being of a non-tangible, virtual form, such as a digital file that may be projected by a projector onto a flat wall. Calibration chart 300 includes a background 301 and an array of dots 302 that are arranged in rows 303 and columns 304. Each dot 302 contrasts the background 301. For example, the background 301 is white or has a light color, and each dot 302 is black or has a contrasting dark color. Conversely, the background 301 may also be black or have a dark color, and each dot 302 may be white or have a contrasting light color. Each dot 302 may be of circular shape, or of other shapes, such as regular polygons (hexagons, 12-gons, etc.). Circular dot or regular polygon with many sides (six or more) has a desirable characteristic of having a high degree of symmetry, and allows one to reliably identify the center of the dot or polygon, even when an image of the dot or polygon is out of focus and blurry.

The array of dots 302 comprises a first dot array 310 made up of a first type dot 311, and a second dot array 320 made up of a second type dot 321. The first type dot 311 and the second type dot 321 are differentiated by certain characteristics, such as size, shape, color, etc. For example, the first type dot 311 has a diameter that is about 30% larger than the second type dot 321, as shown in FIG. 3. Alternatively, the first type dot 311 may be black whereas the second type dot 321 may be blue, and so on.

Figure 3A:
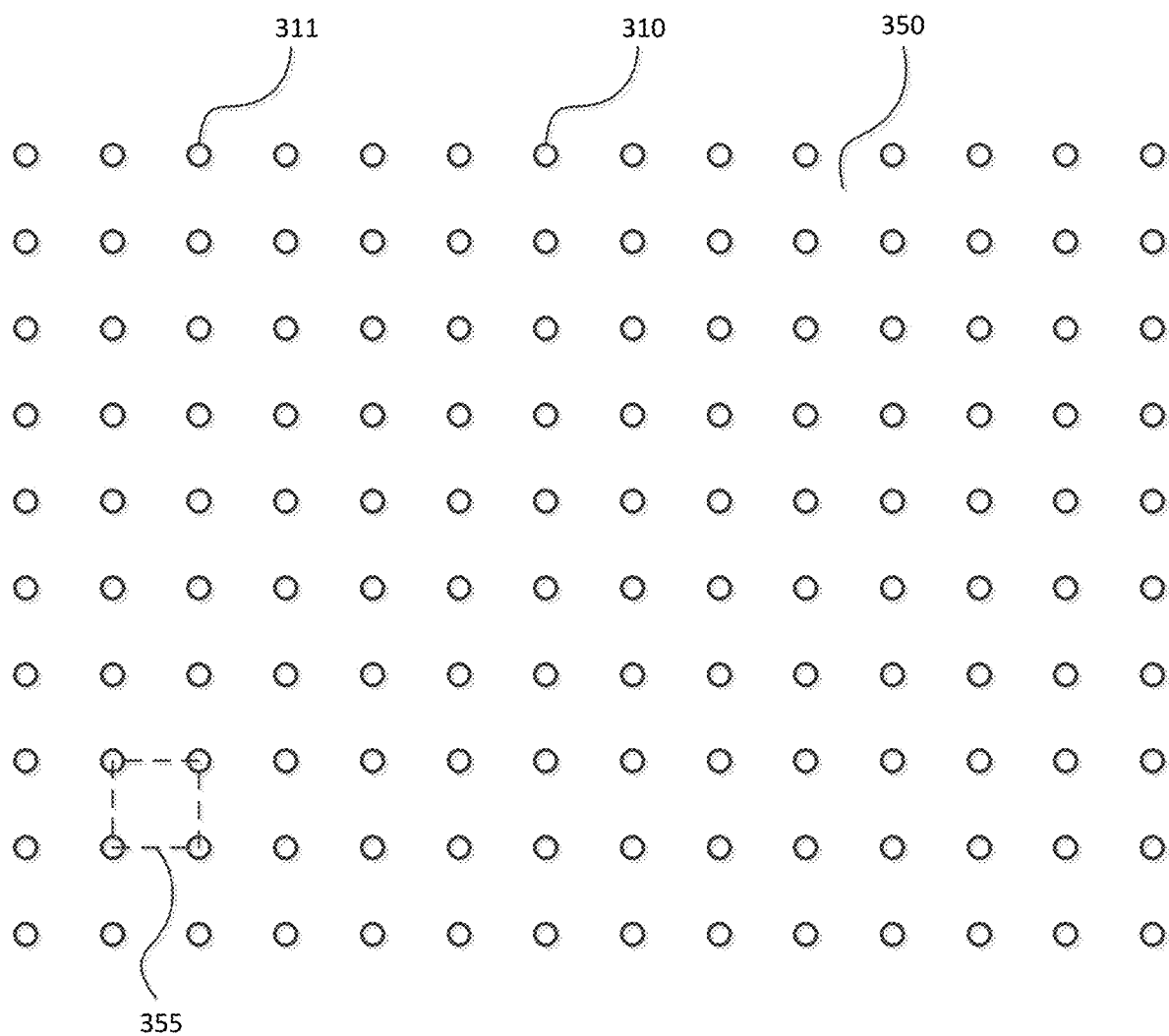
FIG. 3A shows a first dot array of a multitude of first type dots of the exemplary dot array calibration chart.
Figure 3B:
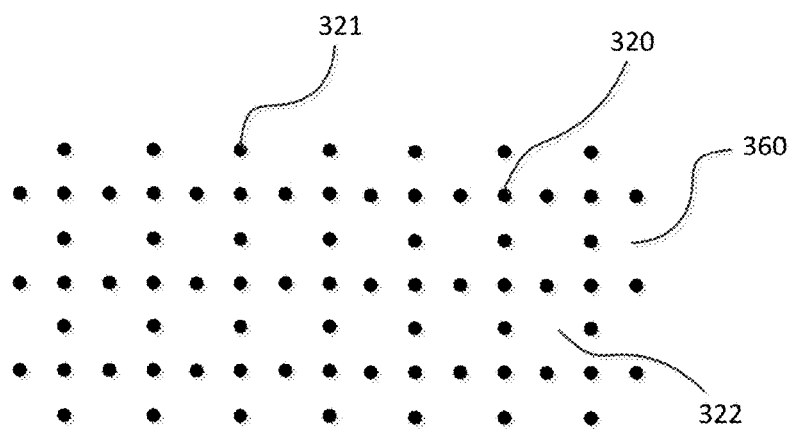
FIG. 3B shows a second dot array of a multitude of second type dots of the exemplary dot array calibration chart.
Figure 3C:
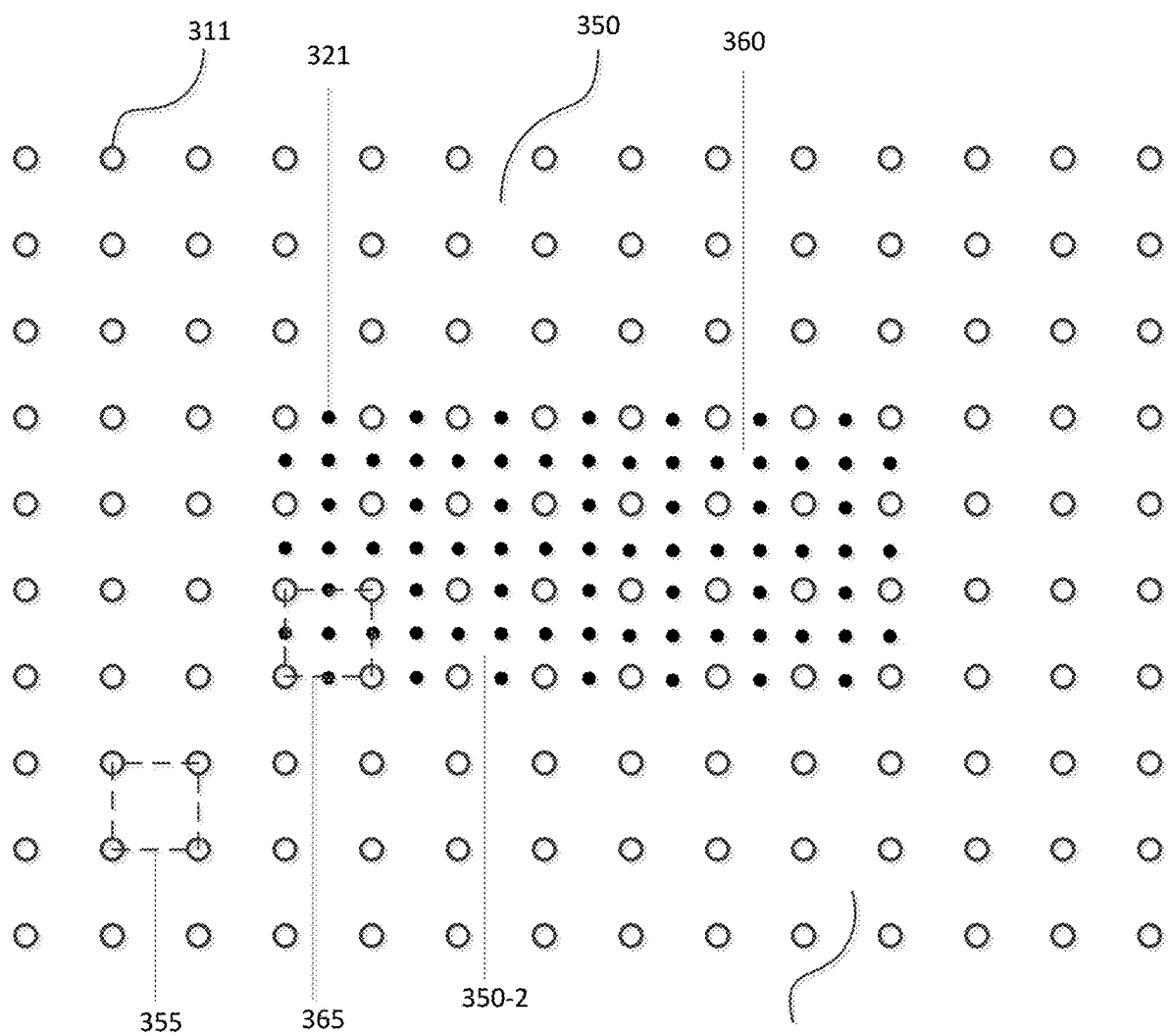
FIG. 3C shows a resulting dot array after superimposing the first dot array and the second dot array.

FIG. 3 shows the second dot array 320 being superimposed on to the first dot array 310. FIGS. 3A, 3B, and 3C are described herein to further disclose the superimposing arrangement of the first and second dot arrays in additional detail.

FIG. 3A shows the first dot array 310, made up of only the first type dots 311. For illustrative purpose only, each first type dot 311 is depicted herein as an open circle dot, in order to be clearly distinguished from the second type dot 321 as disclosed below. In practice, the first type dot 311 and the second type dot 321 may both be solid dark circular dots. The first dot array 310 fully occupies a first chart region 350. The first region 350 has an evenly spaced array of first type dots 311, with a first dot density. For example, the dot density in a first dot density region 355 is one per unit area ($1=\frac{1}{4}*4$).

FIG. 3B shows a second dot array 320, including only the second type dots 321. For illustrative purpose, each second type dot 321 is depicted as a solid circle dot, in order to be clearly distinguished from the first type dot 311 that is depicted as an open circle in FIG. 3A. In practice, the first type dot 311 and the second type dot 321 may both be solid dark circular dots. The second dot array 320 fully occupies a second chart region 360. Comparing the dot arrangement pattern of the second dot array 320 in FIG. 3B with that of the first dot array 310 in FIG. 3A, it is appreciated that the second dot array 320 includes evenly spaced gaps 322. If these gaps 322 were each occupied with a second type dot 321, then the second dot array 320 would have an evenly spaced array of second type dots 321. The purpose of these gaps 322 becomes clear when the second dot array 320 is superimposed on to the first dot array 310, as disclosed below.

FIG. 3C shows a superposition of the first and second dot arrays, wherein the second dot array 320 is positioned around the center of the first dot array 310. Due to this superposition, each gap 322 within the second dot array 320 (as shown in FIG. 3B) is now occupied by a first type dot 311. The second region 360 is still fully occupied by the second type dots 321, but this region is now also occupied by a number of the first type dots 311. A partial first region 350-2 now overlaps with the second region 360, wherein this overlapped first region 350-2 encompasses the entirely of the second region 360, hence these two regions 360 and 350-2 are synonymous. The other part of the first region 350-1 does not overlap with the second region 360. This non-overlapped first region 350-1 still maintains it original, evenly spaced pattern of the first type dots 311, as well as its first dot density of one per unit area.

It is appreciated that, after the superposition of the first and second dot arrays 310 and 320, the second region 360 is now occupied by both the first type dots 311 and the second type dots 321, and has a second dot density that is four times the value of the first dot density. For example, as shown in FIG. 3C, the dot density in a first dot density region 355 that is located within the non-overlapped first region 350-1 is one ($1=\frac{1}{4}*4$), whereas the dot density in a second dot density region 365 that is located with the second region 360 is four ($\frac{1}{4}*4+\frac{1}{2}*4+1=4$).

Referring back to FIG. 3, it is appreciated that the array of dots 302 includes the first dot array 310 as previously described in FIG. 3A, and the second dot array 320 as previously described in FIG. 3B. The first dot array 310 is made up of only the first type dots 311, whereas the second dot array is made up of only the second type dots 321. Chart 300 is formed by superimposing the first and second dot arrays 310 and 320, similar to the description of FIG. 3C.

Before the first and second dot arrays 310 and 320 are superimposed, the first dot array 310 fully occupies the first chart region 350 as previously described in FIG. 3A, whereas the second dot array 320 fully occupies the second chart region 360 as previously described in FIG. 3B. The superposition of the first and second dot arrays 310 and 320 results in the non-overlapped first region 350-1, and the overlapped first region 350-2 that is synonymous with the second chart region 360, as previously described in FIG. 3C. The non-overlapped first region 350-1 is made up of only the first type dots 311, whereas the second region 360 (synonymous with the overlapped first region 350-2) is made up of a mixture of the first and second type dots 311 and 321. The first dot density of the first region 350 before superposition is the same as the dot density of the non-overlapped first region 350-1 after superposition, and is one per unit area. In comparison, the second dot density of the second region 360 after superposition is four per unit area, which is four times the first dot density.

The chart 300 includes a group of first markers 355. FIG. 3 shows an example of a group of four first markers 355, each located inside the first region 350; more specifically, at a corner and border area near the second region 360. The four first markers 355 are evenly spaced to define a rectangular region that substantially overlaps the second region 360. Alternatively, there may be a group of three, five, or some other number of first markers 355 in the aforementioned corner and border area. Each first marker 355 is of circular or polygonal shape, which is subdivided into circular or polygonal sectors, wherein all sectors meet at the center of the circle or polygon, and are alternately filling with dark and light colors. For example, each first maker 355 is a circle that is subdivided into four equal quadrants that are alternately black and white, as shown in FIG. 3.

The chart 300 also includes a group of second markers 365, each located inside the second region 360, as shown in FIG. 3. The four second markers 365 are evenly spaced to define a rectangular region inside the second region 360. Alternatively, there may be a group of three, five, or some other number of second markers 365 inside the second region 360. Similar to the first markers 355, each second marker 365 is of circular or polygonal shape, which is subdivided into circular or polygonal sectors that are alternately filling with dark and light colors. As an example, each second maker 365 is a circle which is subdivided into four equal quadrants that are alternately black and white, as shown in FIG. 3.

It is appreciated that each first marker 355 is differentiated from each second type marker 365 by certain characteristics, such as size and pattern. For example, as shown in FIG. 3, each first maker 355 has a diameter that is twice that of each second type marker 365. Additionally, the black-white quadrant permutation pattern inside each first marker 355 is opposite to each second marker 365.

Chart 300 includes a singular third marker 375 that is located around the center of the chart, which is also around the center of the second region 360. The singular third marker 375 preferably includes at least one sharp edge for the purpose of focusing a camera. In FIG. 3, the third marker 375 is a business logo, but other shapes may also be viable, as long as there is at least one sharp edge. Chart 300 also includes a group of fourth markers 385, each located around a corner of the chart 300. The fourth markers 385 are optional.

It is appreciated that each second marker 365 is closer in distance to the third marker 375 than each first marker 355. This is because the third maker 375 is located around the center of the second region 360; each second marker 365 is located substantially inside the second region 360; and each first marker 355 is located in an area around an outer border of the second region 360, so is further away from the central third marker 375.

It is appreciated that the third marker 375 that is located near the center of the second region 360 is in fact slightly off center. More specifically, the third marker 375 subdivides the second region 360 into a left portion 360L and a right portion 360R, wherein the left portion 360L has a different number of columns of dots (e.g., 19 columns) than the right region 360R (e.g., 21 columns). This slightly off-center design feature is useful for one to quickly discern whether the chart 300 is right side up or upside down, by counting the number of dot columns in the left (360L) and right (360R) portions of the second region 360, respectively.

An optional feature regarding the dots inside the second region 360 is disclosed herein. The second region 360 is specifically captured by the telephoto lens camera 203 (see FIG. 2A) for its calibration, and the telephoto lens camera 203 is more vulnerable than the wide FOV camera 202 with regard to optical aberration, due to the nature of the lens of the telephoto camera 203. Optical aberration such as the coma (comatic aberration) or astigmatism degrades a regularly shaped image to a blurry and irregularly shape image. In the current disclosure, the image of a circular dot inside the second region 360 as captured by the telephoto camera 203 may become blurry, and may even become distorted into a non-circular shape due to optical aberration. This will make it difficult to readily identify the center of the dot. To solve this problem, an optional design feature is instituted for each dot inside the second region 360, as further disclosed herein.

Figure 3D:
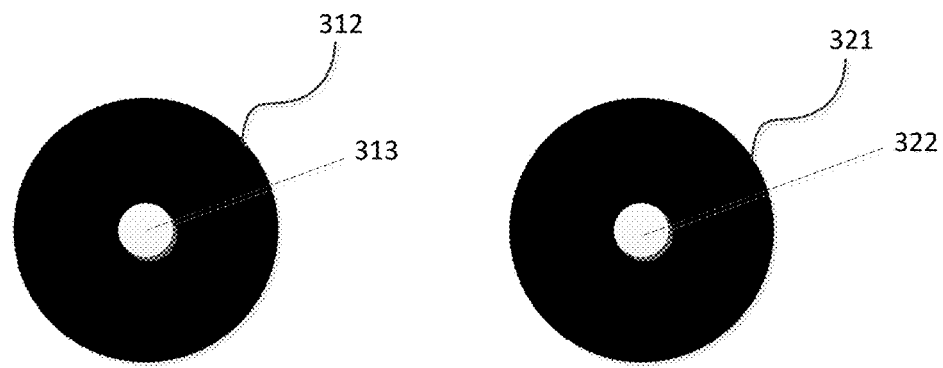
FIG. 3D shows an exemplary variant first type dot and an exemplary second type dot.

Each second type dot 321 inside the second region 360 may have a circular second type dot center 322, as shown in FIG. 3D. The second type dot center 322 contrasts the rest of the second type dot 321, e.g., light color versus dark color. The second type dot center 322 has a diameter that is at most one tenth that of the second type dot 321, in order to achieve a balance of making the dot center 322 identifiable without making it too big.

Similarly, each first type dot 311 inside the second region 360 may be a variant first type dot 312 that has a circular first type dot center 313, also shown in FIG. 3D. The variant first type dot 312 is similar to a regular first type dot 311, but has the circular dot center 313. The first type dot center 313 contrasts the rest of the variant first type dot 312, e.g., light color versus dark color. The first type dot center 313 has a diameter that is at most one tenth that of the variant first type dot 312, in order to achieve a balance of making the dot center 313 identifiable without making it too big.

The first and second type dot centers 313 and 322 inside the first and second type dots 312 and 321, which are within the second region 360, are instituted in part to help make it easier to readily identify the centers of images of the first and second type dots 312 and 321, as taken by the telephoto camera 203. This is particularly relevant in an optical aberration situation, wherein the dots 312 and 321 may become blurry and are distorted into non-circular shapes.

Figure 4:
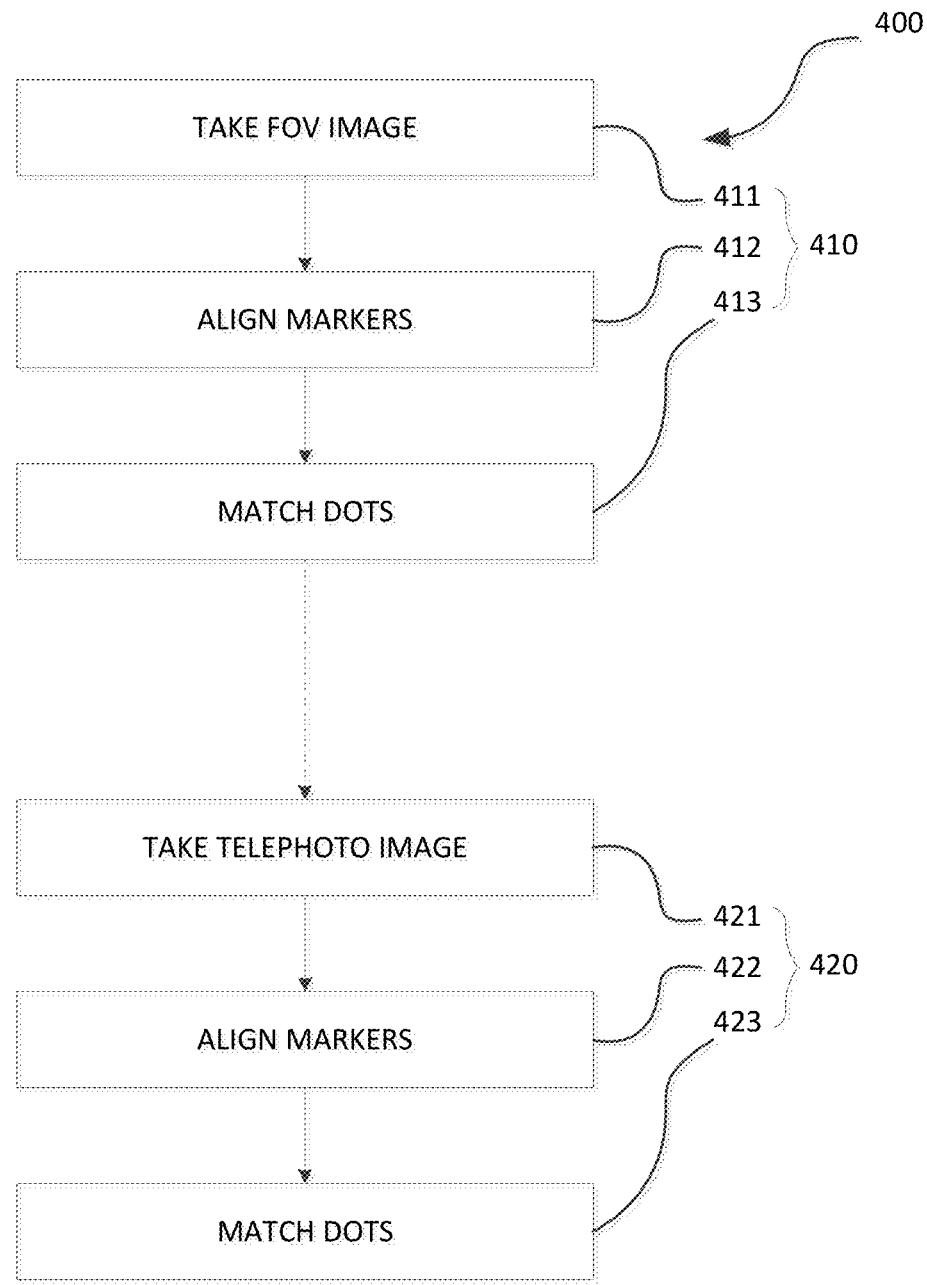
FIG. 4 is method of steps to calibrate a dual camera module with a dot array calibration chart.

FIG. 4 discloses an exemplary calibration method 400 of using the calibration chart 300 as disclosed above to calibrate the dual camera module 201 comprising a wide FOV camera 202 and a telephoto camera 203. This exemplary calibration method 400 is better understood in conjunction with the previously disclosed Figure series 2 and 3, and is disclosed in further details herein.

Method 400 includes two overall steps 410 and 420. Step 410 includes a number of sub-steps. In sub-step 411, at an orthogonal viewing position, the wide FOV camera 202 takes a wide FOV image of the entire calibration chart 300, including the first and second dot arrays 310 and 320 comprising the first and second type dots 311 and 321. Chart 300 also has the first and second regions 350 and 360 that include the first, second, and third markers 355, 365, and 375, as disclosed above. This taken image is similar to the wide FOV image 230 as disclosed in FIG. 2B. Then, the wide FOV image 230 is matched to an ideal image (similar to the ideal image 220 as disclosed in FIG. 2AB) that is pre-stored in the camera memory 204. This matching is done in two steps of coarse and fine-tuned matching. First, in sub-step 412, the images of the first markers 355 are aligned with the first markers of the ideal image 220. This is the coarse matching step. Then, in sub-step 413 of fine-tuned matching, the image of first dot array 310 is matched, in a dot by dot fashion, to the first dot array of the pre-stored ideal image 220. The second dot array 320 is not involved in step 413. In other words, only the first region 350 is involved, whereas the second region 360 is not involved. The output parameters of the wide FOV camera 202 are adjusted to effectuate a precise matching of the dots between the wide FOV image 230 and the ideal image 220. The result is a precise calibration of the wide FOV camera 202 to correct for its problems such as lens distortion and positional misalignment.

Step 420 may be performed in parallel to, or be interchanged with step 410. Similar to step 410, step 420 also includes a number of sub-steps. In sub-step 421, at an orthogonal viewing position, the telephoto camera 203 takes a telephoto image of the second region 360 of the calibration chart 300, wherein this second region 360 includes the first and second dot arrays 310 and 320 comprising the first and second type dots 311 (or variant 312) and 321, as well as the second and third markers 365, and 375, as disclosed above. This taken image is similar to the telephoto image 240 as disclosed in FIG. 2C. Then, the telephoto image 240 is matched to the ideal image 220 that is pre-stored in the camera memory 204. This matching is also done in two steps of coarse and fine-tuned matching. First, in sub-step 422, the images of the second markers 365 are aligned with the second markers of the ideal image 220. This is the coarse matching step. Then, in sub-step 423 of fine-tuned matching, the image of the first and second type dots 311 (or 312) and 321 inside the second region 360 is matched, in a dot by dot fashion, to the second region of the pre-stored ideal image 220. The part of the first dot array 310 that is outside the second region 360 is not involved in step 413. The output parameters of the telephoto camera 203 are adjusted to effectuate a precise matching of the dots between the telephoto image 240 and the ideal image 220. The result is a precise calibration of the telephoto camera 203 to correct for its problems such as lens distortion and positional misalignment.

Figure 4A:
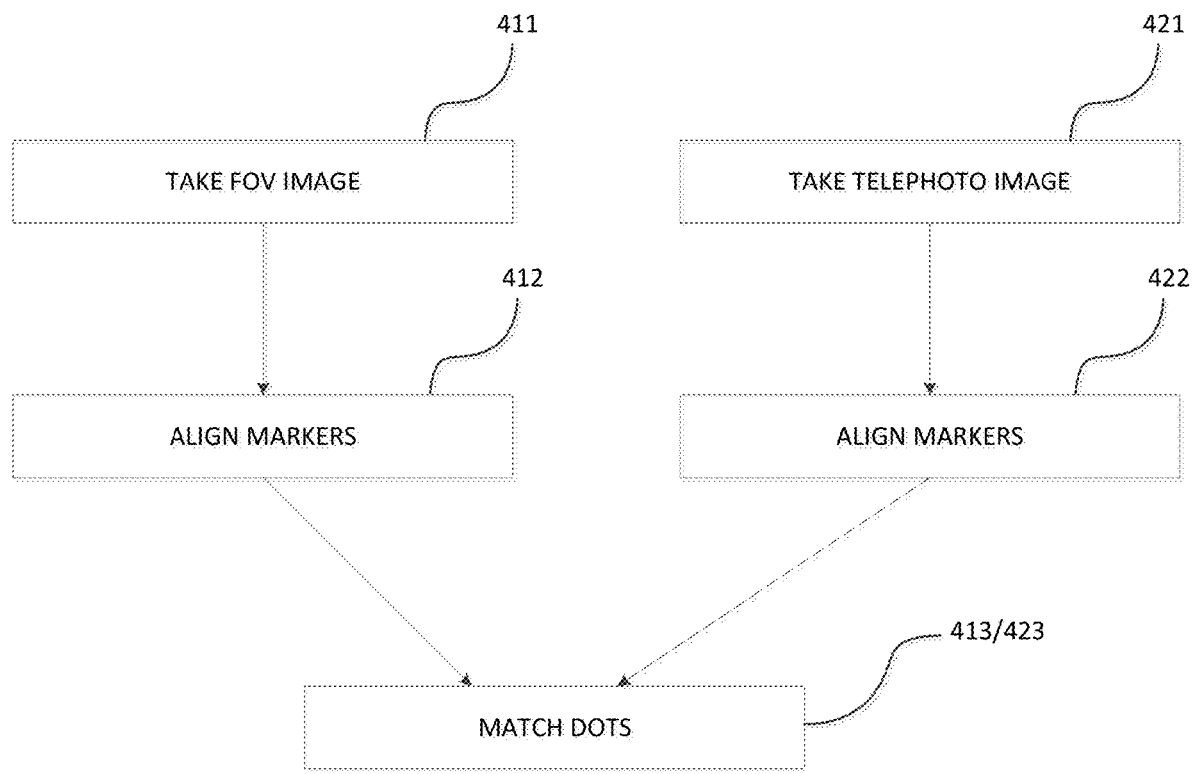
FIG. 4A is an alternative order of steps to calibrate a dual camera module with a dot array calibration chart.

It is appreciated that the coarse matching steps 412 and 422 should be performed after the image taking steps 411 and 421, respectively, and the fine-tuned matching steps 413 and 423 should be performed thereafter. It is also appreciated that the fine-tuned matching steps 413 and 423 may be performed as a combined step, as shown in FIG. 4A.

The reason that the second dot density of the second region 360 is four times the first dot density of the first region 350 is evident in the fact that telephoto camera 203 may be a 2× zoom camera vis-à-vis the wide FOV camera 202. When the wide FOV camera 202 takes an image of the entire chart 300, and uses only the first dot array 310 for calibration, the first dot density of one per unit area is present throughout the entire image. When the telephoto camera 203 takes an image of the second region 360 of the chart 300, and uses it for calibration, the second dot density is four per unit area, but after a 2× zoom (in both the length and the width of the image), the resulting dot density will be reduced by a factor of four, to one dot per unit area for the dot matching step 423. As a result, the telephoto camera 203 may use substantially the same fine-tuned dot matching procedure or algorithm as the wide FOV camera 202. This benefit is achievable in part due to the relationship of the second dot density vis-à-vis the first dot density.

In the preceding disclosure, a dual camera system comprising a wide FOV camera and a 2× telephoto camera is used to illustrate various embodiments of the invention. It is appreciated that the scope of invention is not limited to the wide FOV camera and telephoto camera pair. The wide FOV camera and telephoto camera are only exemplary terms that are used for illustrative purposes. Other terms referring to a first camera and a second camera (for example, a first camera of a first focal length and a second camera of a second focal length) are equally applicable in this disclosure. Further, in some instances, the first focal length is twice the second focal length.

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. A method of using a chart to calibrate a camera system, wherein the camera system includes a first camera, a second camera, and a memory unit with a pre-stored ideal chart image, and wherein the chart comprises:
    a background;
    an array of dots contrasting the background, wherein the array of dots are arranged in rows and columns, wherein the array of dots comprise a first dot array of evenly spaced dots with a first dot density, and a second dot array of evenly spaced dots with a second dot density, wherein the first dot array fully occupies a first region, the second dot array fully occupies a second region, and wherein the second region is enclosed within the first region;
    a group of first markers in the first region, a group of second markers in the second region, and a third marker at the center of the chart, wherein each second marker is closer to the third marker than each first marker, and wherein each first marker is differentiated from each second marker;
    wherein the method includes:

a) a step of using the first camera to take a first image of the chart, wherein the first image contains images of the first region, the first markers, and the array of dots, followed by matching the first image to the pre-stored ideal image; and b) a step of using the second camera to take a second image of the chart, wherein the second image contains images of the second region, the second markers, and the array of dots, followed by matching the second image to the pre-stored ideal image.

2. The method of claim 1, wherein the first camera has a first focal length,
and the second camera has a second focal length, wherein the first focal length is twice the second focal length.

3. The method of claim 2, wherein the first camera is a wide field-of-view camera, and the second camera is a telephoto lens camera.

4. The method of claim 2, wherein step a) is interchangeable with step b).

5. The method of claim 2, wherein the matching the first image to the pre-stored ideal image of step a) further includes:
aligning the images of the first makers to the pre-stored ideal chart image; and
matching the array of dots to the pre-stored ideal chart image.

6. The method of claim 2, wherein the matching the second image to the pre-stored ideal image of step b) further includes:
aligning the images of the second makers to the pre-stored ideal chart image; and
matching the array of dots to the pre-stored ideal chart image.

7. A method of using a chart to calibrate a camera system, wherein the camera system includes a first camera, a second camera, and a memory unit with a pre-stored ideal chart image, and wherein the chart comprises:

a background;

an array of dots contrasting the background, wherein the array of dots are arranged in rows and columns, wherein the array of dots comprise a first dot array of evenly spaced dots with a first dot density, and a second dot array of evenly spaced dots with a second dot density, wherein the first dot array fully occupies a first region, the second dot array fully occupies a second region, and wherein the second region is enclosed within the first region;

a group of first markers in the first region, a group of second markers in the second region, and a third marker at the center of the chart, wherein each second marker is closer to the third marker than each first marker, and wherein each first marker is differentiated from each second marker;

wherein the method includes:

a) a step of using the first camera to take a first image of the chart, wherein the first image contains images of the first region, the first markers, and the array of dots, followed by aligning the images of the first makers to the pre-stored ideal chart image;

b) a step of using the second camera to take a second image of the chart, wherein the second image contains images of the second region, the second markers, and the array of dots, followed by aligning the images of the second makers to the pre-stored ideal chart image; and c) matching the array of dots of the first image and the second image to the pre-stored ideal chart image.

8. The method of claim 7, wherein the first camera is a wide field-of-view camera, and the second camera is a telephoto lens camera.

9. The method of claim 7, wherein step a) is interchangeable with step b).

* * * * *